US009058384B2

(12) United States Patent
Berres (10) Patent No.: US 9,058,384 B2
(45) Date of Patent: Jun. 16, 2015

(54) SYSTEM AND METHOD FOR IDENTIFICATION OF HIGHLY-VARIABLE VOCALIZATIONS (75) Inventor: Mark Berres, Arena, WI (US)

(73) Assignee: WISCONSIN ALUMNI RESEARCH FOUNDATION, Madison, WI (US)

(*) Notice: Subject to any disclaimer, the term of this patent is extended or adjusted under 35 U.S.C. 154(b) by 562 days.

(21) Appl. No.: 13/440,975

(22) Filed: Apr. 5, 2012

(65) Prior Publication Data

US 2013/0266147 A1 Oct. 10, 2013

(51) Int. Cl.
H04R 29/00 (2006.01)
G06F 17/00 (2006.01)
G10L 15/00 (2013.01)
G06F 17/30 (2006.01)
G10L 25/54 (2013.01)
G10L 17/26 (2013.01)
G10L 19/018 (2013.01)

(52) U.S. Cl.
CPC .......... G06F 17/30743 (2013.01); G10L 25/54 (2013.01); G10L 17/26 (2013.01); H04R 2499/11 (2013.01); H04S 2400/15 (2013.01); G10L 19/018 (2013.01)

(58) Field of Classification Search
CPC ........ G01H 3/14; H04R 29/004; G10L 17/26; G10L 25/54; G06F 17/30743
USPC ................................ 381/56; 700/94; 704/239
See application file for complete search history.

(56) References Cited

U.S. PATENT DOCUMENTS 7,377,233 B2    5/2008  Patton
2004/0107104 A1 6/2004  Schaphorst
2005/0049877 A1* 3/2005  Agranat ........................ 704/270

* cited by examiner

Primary Examiner — Vivian Chin
Assistant Examiner — Douglas Suthers
(74) Attorney, Agent, or Firm — Quarles & Brady, LLP (57) ABSTRACT A system and method for identifying a bird vocalization is presented. An input audio signal representing the bird vocalization is captured. A fingerprint of the input audio signal is then generated. A score of a similarity of the fingerprint to at least one of a plurality of predetermined fingerprints is determined by determining a desirable alignment between the fingerprint and the at least one of a plurality of predetermined fingerprints. A report can be generated based on the score of the similarity and an identity of the at least one of the plurality of the predetermined fingerprints, the report identifying a bird species associated with the bird vocalization.

19 Claims, 5 Drawing Sheets

FIG. 5 understood# SYSTEM AND METHOD FOR IDENTIFICATION OF HIGHLY-VARIABLE VOCALIZATIONS

STATEMENT REGARDING FEDERALLY SPONSORED RESEARCH

N/A.

FIELD OF THE INVENTION

The field of the invention is systems and methods for identification of highly-variable audio signals. More particularly, the invention relates to systems and methods for generating and scoring acoustic fingerprint data to identify highly-variable audio signals, such as avian vocalizations.

BACKGROUND OF THE INVENTION

A number of systems exist for the automatic identification of an audio signal. Some such systems rely on an acoustic "fingerprint" of an input audio signal to identify the audio signal. The fingerprint is a condensed digital summary of salient features of the input audio signal. Once generated, the fingerprint is compared to a number of fingerprints of known audio signals stored in a database. If a matching fingerprint is found, the input audio signal is determined to be a duplicate or very similar copy of the known audio signal having the matching fingerprint.

A key factor in the effectiveness of existing acoustic fingerprinting systems is the quality and similarity of the input audio signal and the known matching signal. The more closely the two signals match one another, the more accurately an input audio signal can be matched to a stored signal.

For example, some fingerprinting systems are arranged to identify input music signals using a database of stored original signals. The systems allow a user to capture a sample of a music or other audio signal, for example sampled from a broadcast radio, or television signal. That captured or sampled signal is then "fingerprinted," and the fingerprint is compared to previously-fingerprinted copies of thousands of known, original music or other audio signals stored in a database. If a matching fingerprint is found, the captured music signal can be identified based on data associated with the matching original.

Such systems are highly effective when the captured input music signal is a near perfect copy of the original music signal stored within the database. Even though the broadcast may include some noise, minor frequency alteration, compression, or equalization and ambient noises may be present, the broadcast audio signal almost perfectly matches the original copy. Thus, the fingerprints, but for small variations created by noise or global amplitude variations caused by compression or poor recording signal strength, are very similar, making a match easier to detect. In contrast, if the input audio signal displays variations in the speed (e.g., faster or slower) of the acoustic sample, relative to the original, the systems have severe difficulty in identifying the input audio signal.

This problem is further exacerbated when comparing signals where no true "original" can be identified or where the sample is not an exact copy of an "original." For example, such systems struggle and generally fail when attempting to identify a "live" version of a piece of music, even when performed in the same key and by the same artist, when the "live" version includes tempo changes or other artistic variations that cause the fingerprint of the "live" version to differ from the "original fingerprint."

As another example, such systems fail in the analysis of bird calls or other naturally occurring sounds. A bird may sing the same song repetitively. However, in the case of bird calls, for example, there is no 'perfect' original bird call. Every time a bird sings a song there is some variation from one rendition to the next and no perfect song can be captured. To the casual human listener, the perceptual qualities contained within the song (e.g. amplitude, pitch, and tempo) often sound unchanging and repetitive. But closer analysis shows that significant variation exists in avian vocalizations, so much so that application of existing technologies used to identify music or video cannot be applied to bird vocalizations.

Therefore, it would be desirable to have a system and method for analyzing and identifying highly-variable audio signals, such as avian vocalizations.

SUMMARY OF THE INVENTION

The present invention provides a system and method for identification of highly-variable audio signals. More particularly, the invention relates to systems and methods for generating and scoring acoustic fingerprint data to identify highly-variable audio signals, such as avian vocalizations.

In one implementation, a system for identifying a bird vocalization is disclosed that includes a processor configured to receive a fingerprint of an input audio signal sampling a bird vocalization. The process is configured to analyze the fingerprint of the input audio signal and compare the fingerprint of the input audio signal to a set of categorized samples of bird vocalization to determine an identity of a bird species associated with the bird vocalization. The identity being is determined by a similarity of the fingerprint of the input audio signal to at least one of a plurality of predetermined fingerprints within the set of categorized samples of bird vocalizations, wherein the similarity is determined by determining a score of a desirable alignment between the fingerprint and the at least one of a plurality of predetermined fingerprints. The processor is then configured to generate a report including content associated with the bird species.

In another implementation, the present invention is a device for identifying a bird vocalization including a microphone for capturing an input audio signal representing the bird vocalization, and a processor connected to the microphone. The processor is configured to generate a fingerprint of the input audio signal, transmit the fingerprint to a remote server, and receive, from the remote server, an identity of a bird species associated with the bird vocalization. The identity is determined by a similarity of the fingerprint to at least one of a plurality of predetermined fingerprints. The similarity is determined by determining a score of a desirable alignment between the fingerprint and the at least one of a plurality of predetermined fingerprints. The processor is configured to generate a report including content associated with the bird species.

In another implementation, the present invention is a method of identifying a bird vocalization including receiving a fingerprint of an input audio signal representing the bird vocalization, and determining a score of a similarity of the fingerprint to at least one of a plurality of predetermined fingerprints by determining a desirable alignment between the fingerprint and the at least one of a plurality of predetermined fingerprints. The method includes generating a report based on the score of the similarity and an identity of the at least one of the plurality of the predetermined fingerprints. The report identifies a bird species associated with the bird vocalization.

In another implementation, the present invention is a method of identifying a bird vocalization including capturing an input audio signal representing the bird vocalization, generating a fingerprint of the input audio signal, and transmitting the fingerprint to a remote server. The method includes receiving, from the remote server, an identity of a bird species associated with the bird vocalization. The identity is determined by a similarity of the fingerprint to at least one of a plurality of predetermined fingerprints. The similarity is determined by determining a score of a desirable alignment between the fingerprint and the at least one of a plurality of predetermined fingerprints. The method includes generating a report including content associated with the bird species.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Some of the functional units described in this specification have been labeled as modules in order to more particularly emphasize their implementation independence. For example, a module may be implemented in field programmable gate arrays, programmable array logic, programmable logic devices, or the like. Modules may also be implemented in software for execution by various types of processors.

Figure 3:
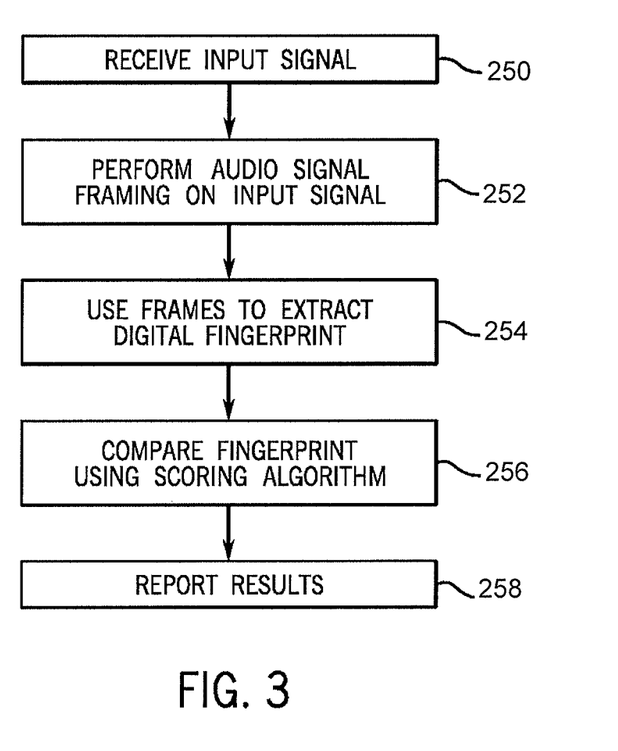
FIG. 3 is a flowchart illustrating a method for identifying a highly-variable audio signal, such as an avian vocalization, in accordance with the present disclosure.

The schematic flow chart diagrams included are generally set forth as logical flow-chart diagrams (e.g., FIG. 3). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present is defined in terms of systems and methods for identifying vocalizations made by birds, however it is to be understood by a person of ordinary skill in the art that the present invention may be incorporated into systems for identifying signals received from a number of sources including biological sources (e.g., animals) or non-biological sources (e.g., machines, sensors, and the like). In contrast to conventional signal identification systems, the present system allows for the identification of an input signal where no perfect or "true" original exists. Specifically, the system is arranged to deterministically create an acoustic fingerprint of an input signal, where the fingerprint includes a digital summary of an audio signal that can be used to identify similar (or differing) summaries in a pre-existing acoustic database.

A length of audio input can be converted into a low-dimensional vector that contains certain spectral and temporal features. This vector can be used as an acoustic fingerprint that is then compared against a database of pre-computed fingerprints using a dynamic linear programming (DLP) algorithm to accommodate intrinsic spectral and temporal variation in the audio signal. A match determination is made using a scoring system and selecting (or reporting) the highest scoring alignment (or alignments) of both the query and subject (database) sequences. The present system may use DLP to construct a global alignment using the entire fingerprint of the query and any of the database fingerprints. In other implementations, though, DLP is used to construct local alignments by scoring the alignment of sub-regions of the query and database sequences. Computationally, this technique is faster and may also be useful to conquer temporal issues related to alignment of audio fingerprints.

In one implementation, the present system provides for acoustic fingerprinting capable of automatically identifying vocalizations made by birds. The vocalizations may include bird songs or calls. Songs are typically sung by males during the breeding season while bird calls are given by both sexes throughout the year. First, an acoustic fingerprint of the recorded sound is created. Specifically, a length of audio input is converted into a vector, for example, a low-dimensional vector, that contains certain spectral and temporal features. This acoustic fingerprint is then compared against a database of pre-computed fingerprints using a DLP algorithm. A match determination is made using a scoring system that is less sensitive to spectral and temporal variation than existing methods and is capable of identifying not only among bird species, but also dialects and individuals. The invention may be implemented in software and may be executed by standard various systems having a processor, including mobile electronic devices such as a mobile telephone, tablet, or personal computer.

Figure 1:
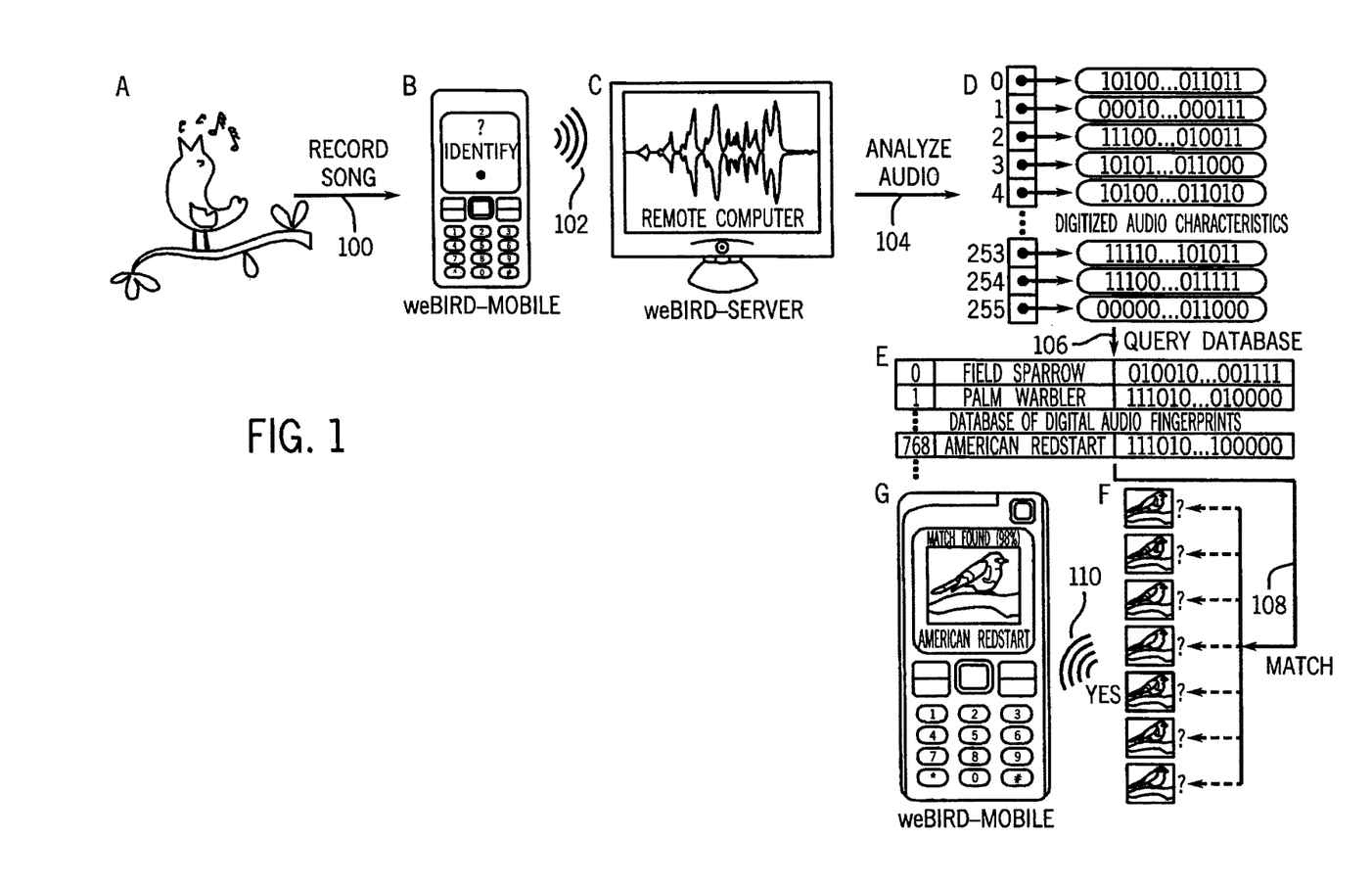
FIG. 1 is a schematic chart illustrating an example use case of the present system for identifying avian vocalizations.

FIG. 1 is a schematic chart illustrating an example use case of the present system for identifying avian vocalizations. In the use case, a user of the system hears a birdsong and would like to identify the singing bird. To use the system, in step 100, the user captures an avian vocalization (i.e., birdsong) using an electronic device having an appropriate microphone, such as may be included in a cell phone, digital recorder, or laptop. A digital representation of that bird song is then transmitted to a remote server in step 102 for analysis. Of course, in some systems, such as those utilizing systems capable of storing and processing a large database, the transmission to a remote server may be foregone and processing performed locally. However, in this example, the information transmitted to the remote server may include a complete copy of the recorded vocalization, only a portion of the recorded copy, a fingerprint representative of the recorded vocalization, or combinations thereof.

Upon receipt of the representation of the vocalization, the remote server analyzes a number of features of the representation, as discussed below, in step 104. That analysis may include identifying a number of unique features or attributes of the received information.

In one implementation, the system first performs audio signal framing on the digital representation of the bird song received from the electronic device.

After identifying the appropriate attributes of the representation, the remove server compares those attributes against a number of attributes of known bird songs stored in a database in step 106. As discussed above, unlike conventional sound recording identification systems that look for a perfect match, the present system uses a dynamic system, as described below, to identify the best match out of a listing of candidate birds.

Accordingly, in step 108, the system selects the best match from a listing of candidate bird songs. When the most likely bird song is identified, the system transmits information describing the associated bird back to the user's electronic device in step 110. The information transmitted back to the user may include images, video, audio, range maps, audio spectrograms, species description, match statistics, and the like. The information may be communicated to the electronic device via any suitable means such as instant message, email, or HTTP. In some implementations, the bird song information is tweeted to the device. Alternatively, the user's electronic device may store a library of images, video, audio, range maps, audio spectrograms, species description, match statistics, and the like for a number of different species. In that case, the system may only transmit a report containing an identification of the bird song or species-unique identifier to the electronic device. The electronic device can then retrieve content associated with that species from the device's local library and display the content for the user.

Figure 2:
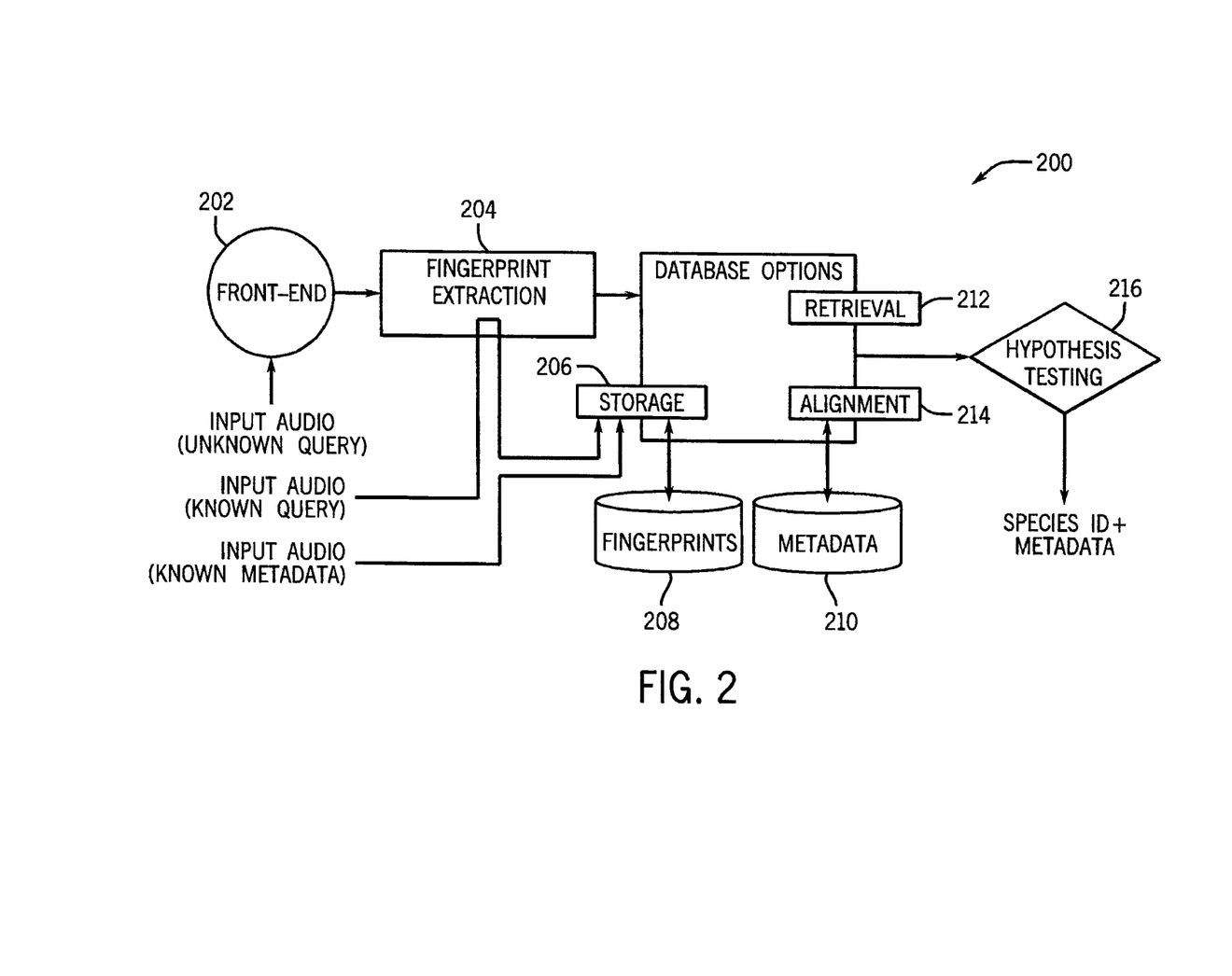
FIG. 2 is a block diagram illustrating functional components of a system for identifying an avian vocalization arranged in accordance with the present disclosure.

FIG. 2 is a block diagram illustrating functional components of a system for identifying an avian vocalization arranged in accordance with the present disclosure. System 200 includes front-end system 202 arranged to receive an input audio signal representing an unknown source.

Fingerprint extraction system 204 is configured to extract a digital fingerprint from an input audio signal. Fingerprint extraction system 204 may receive input audio signals from front-end system 202, where the audio signals have an unknown source, as well as input audio signal from known sources. The fingerprints generated from known sources are stored by storage system 206 in fingerprint database 208 for later comparison to fingerprints having unknown sources. System 200 may also receive additional metadata describing attributes of the known input audio signals. The metadata is stored by storage system 206 in metadata database 210.

When a request to identify an input audio signal having an unknown source is received, a number of database operations assist in analyzing the incoming fingerprint by comparing the fingerprint with stored, known fingerprints. Retrieval system 212 retrieves a number of known fingerprints from fingerprint database 208 for analysis. Retrieval system 212 is also configured to retrieve metadata from metadata database 210 (e.g., after a match is found, metadata describe the known audio fingerprint can be retrieved).

Alignment system 214 provides a scoring used for hypothesis testing (e.g., by hypothesis testing system 216). Scoring generally involve two steps. First, a particular query is aligned (for example, using DLP) to a plurality of stored fingerprints. Second, when the highest scoring match (or a number of high scoring matches) is/are found, the statistical properties of the match are evaluated. As such, hypothesis testing stage 216 evaluates the statistical significance of any match generated (for example, the DLP procedure can match anything, although a poor match will always have a low score).

If desired, the hypothesis testing (i.e. significance) is not necessary in order for the system to report a score. Hypothesis testing may only be performed when the user wished to determine the match reliability. Accordingly, in some implementations of the present system, the hypothesis testing stage 216 may be removed entirely. In practice, however, performing the hypothesis testing provides the best information in terms of species ID and the reliability of the ID (even high-scoring matches can occur randomly; testing will uncover this phenomenon).

With sufficient information retrieved from fingerprint database 208 to perform analysis of the incoming fingerprint, hypothesis testing module 216 analyzes the unknown fingerprint in view of a number of known fingerprints, as described below, to identify a best-match. With a best-match fingerprint identified, system 200 can retrieve information describing the matched fingerprint from metadata database 210 and provide that information to a user.

FIG. 3 is a flowchart illustrating a method for identifying a highly-variable audio signal, such as an avian vocalization, in accordance with the present disclosure. In step 250 an input audio signal is received for analysis. The audio signal may include audio of a bird song or other audio signal and can be captured by any appropriate sound recording system. Recording systems include those associated with mobile phones, personal electronic devices, or other audio recording equipment.

After the audio signal is captured (or, in some cases, during capture) the signal is processed in order to identify a potential matching reference audio signal. Initially, the signal undergoes processing to facilitate analysis of the signal. The initial processing may include segmenting the signal into a number of different, non-overlapping frequency bands or bins.

In contrast to existing analysis systems that utilize logarithmically-spaced frequency bins that are appropriate for analysis of sounds being perceived by humans, the present system may use linearly-spaced bins that, as described below, may be particularly advantageous. That is, many traditional audio processing and matching systems utilize logarithmically oriented scales or processing because the human ear has a logarithmic response to audio. Thus, many traditional systems have sought to match the frequency response of the human ear. However, the present invention recognizes that the human ear is limited in its perception and processing capabilities and advantageously foregoes conventional reliance on logarithmically-based processing in favor of linear processing.

For example, the present invention recognizes that linearly spaced bins are more appropriate for the analysis of many sounds. For example, bird songs often have a frequency that may change rapidly (i.e., too rapidly for human perception). Accordingly, although this approach employs a binning strategy that is arguably less computationally efficient than conventional sound analysis systems such as those described above for analyzing a conventional music, the present system achieves preferable results and levels of accuracy when processing diverse and, particularly, highly-variable audio signals, including bird songs that incorporate rapid frequency and temporal changes.

Referring again to FIG. 3, during the initial processing, as illustrated by step 252, the input audio signal is analyzed to perform signal framing. Sometimes, this is achieved by an initial down-sampling. For example, an input signal sampled at 44.1 kilohertz (KHz) can be down-sampled to 22.05 KHz. The down-sampled signal is then converted to a linear pulse-code modulated (PCM) signal. The PCM signal can be saved, for example, as in a waveform audio file format (WAV) without compression.

With the input signal down-sampled and converted to a PCM signal, a Chebyshev Type II filter can be applied to the down-sampled input audio signal. In one implementation the Chebyshev Type II filter is of order 212 with stopband attenuation 92 dB down from the passband (e.g., 2-8 KHz) and stopband edge frequencies of 1.95 and 8.05 KHz. The use of a filter may be desired to eliminate noise, such as environmental noise (wind, cars, planes etc.). A Chebyshev type II filter can, therefore, be used to eliminate noise outside of a particular frequency range associated with bird vocalizations. The example passband of 1.95-8.05 KHz, for example, can be used to filter for the bird song of the Cerulean Warbler (whose song occupies approximately 2-8 KHz). In contrast to other filter techniques (such as Butterworth filters), the Chebyshev type II filter has less passband ripple, being virtually flat.

In general, the performance of the present system improves when contaminating noise is eliminated from the query (and database) audio signals. Any digital filter (e.g. finite impulse response (FIR), infinite impulse response (IIR))—or even analog filters (at the recording level) can be used to advantageously eliminate extraneous (environmental) noise. They are not required by the system, but may improve the system's performance. Generally, the choice of a specific filter frequency passband is dependent on the frequency content of the song. Fortunately, most environmental noise is 0.5 KHz and below which is below the range of most bird songs or calls.

After filtering, the filtered audio signal can be normalized (e.g., to −3 dB) and then segmented into overlapping frames. In one example, an appropriate frame length is 370 millisecond (ms). The frame length and overlap can be selected in view of particular applications of the present system. Generally, the overlap is selected to be sufficiently large to assure a high degree of similarity of spectral features between subsequent frames. In other words, the spectral features ultimately present in the digital fingerprint vary slowly in time. The reason for this is that the frame boundaries (i.e. start and end position, as a function of time) used in the database are unlikely to match exactly those of any query sequence. In one implementation, for example, a fingerprint is extracted every 11.5625 milliseconds which means that any query processed in the same way would be maximally 11.5625/2 milliseconds off from the boundaries of the database sequences. This is commonly used in music ID applications where only a snippet of audio is compared against a database of entire songs and matches are made by hashing algorithms. Additionally, the degree of framing overlap and windowing function can affect the accuracy of the FFT of a finite, non-periodic signal. In such cases with no framing and no windowing, there is substantial spectral leakage from the FFT operation resulting in inaccurate amplitude and frequency representation (error). This is clearly important for our invention as we bin frequencies and measure their amplitude difference.

Successive frames can be overlapped by a factor, such as 31/32, to be offset from the preceding frame. When an offset factor of 31/32 is used with frames of length 370 ms, each successive frame is offset from the previous frame by (L−ΔL)=370 ms−(370 ms*31/32)=11.5625 ms.

In step 254, the frames are used to extract a digital fingerprint. From each frame a 48-bit digital fingerprint can be extracted from evenly-spaced, non-overlapping frequency bands that were obtained from a calculated power spectral density (PSD) function of the input audio signal. It should be noted that the system may utilize fingerprints having different bit lengths. Generally, fewer bits provide coarser representations, but still can be useful. Larger numbers of bits may provide better frequency resolution, but at a cost of greater computational time.

Ignoring division into individual frequency bands, the periodogram estimates the PSD of a uniformly sampled time series signal $X_n=[x_0, x_1, x_2, \ldots, x_{N-1}]$ as:

$$\hat{P}_{xx}[X(\omega_k)] = \frac{1}{2\pi N}\left|\sum_{n=0}^{N-1} X(t_n)e^{-i\omega_k t_n}\right|^2; \quad \text{Equation (1)}$$

where $X(t_n)$ equals the input signal amplitude at time $t_n$, $i=\sqrt{-1}$, $\omega_k=2\pi k/N$ in units of radians/sample, and k, n=(0, 1, 2, …, N−1) where k and n are frequency- and time-domain sample indices, respectively. If the frequency variable $\omega_k$ is defined as $f_k=(2\pi f)F_s/N$ and normalized by $1/F_s N$, where $1/F_s$ is the sampling interval, the periodogram has units of cycles/second (Hertz). To attenuate the magnitude of spectral leakage occurring near the edges of each frame, a windowing (weighting) function $w_n=[w_0, w_1, w_2, \ldots, w_{N-1}]$ was used to modify Equation (1) to;

$$\hat{P}_{xx}[X(\omega_k)] = \frac{1}{2\pi N}\left|\sum_{n=0}^{N-1} X(t_n)w(t_n)e^{-i\omega_k t_n}\right|^2 \bigg/ \frac{1}{N}\sum_{n=0}^{N-1} w(t_n)^2. \quad \text{Equation (2)}$$

The weighted PSD energy difference between successive frames is thus:

$$ED(f) = \hat{P}_{xx}[X(\omega_k)]_{frame(n+1)} - \hat{P}_{xx}[X(\omega_k)]_{frame(n)} = \quad \text{Equation (3)}$$

$$\frac{1}{2\pi N}\left|\sum_{n=0}^{N-1} X(t_n + \Delta L)w(t_n)e^{-i\omega_k t_n}\right|^2 \bigg/ \frac{1}{N}\sum_{n=0}^{N-1}|w(t_n)|^2 -$$

$$\frac{1}{2\pi N}\left|\sum_{n=0}^{N-1} X(t_n)w(t_n)e^{-i\omega_k t_n}\right|^2 \bigg/ \frac{1}{N}\sum_{n=0}^{N-1}|w(t_n)|^2.$$

Denoting the energy in the estimated PSD for each frequency band m of frame n by E(n,m) and the m-th bit of the of the n-th frame of the PSD energy difference ED(n,m) of frame n by F(n,m), then each extracted bit is defined as:

$$ED(n,m) = (E(n,m) - E(n,m+1)) - (E(n-1,m) - E(n-1,m+1))$$  Equation (4);

Where:

$$F(n,m) = \begin{cases} 1 & \text{if } ED(n,m) > 0 \\ 0 & \text{if } ED(n,m) \leq 0 \end{cases}$$  Equation (5)

The difference calculation shown in Equation (4) and described above calculates a difference of PSD between successive frames. In other implementations, though, other spectral measures, and their differences from frame to frame, can be used. A few examples include Mel frequency cepstral coefficients (MFFC), spectral flatness, sharpness, linear predictive coding (LPC) and a host of others. To use any of these with DLP, the continuous measure is converted to a discrete representation. For example, in this embodiment, a difference between two continuous numerical values can be determined between two successive frames. If the difference is positive, the bit recorded for that frequency bin is 1. If negative or equal, 0. Similar operations can be done with the other measures of spectral features. Also note that DLP is not limited to only a binary comparison—any number of discrete classifiers can be used. The more discrete values compared the longer it takes the DLP to compute. Thus, the simple difference equation in Equation (4) can be thought of as the simplest binary representation of a bitwise signal difference.

Employing a Hann weighting function, $$w_n = 0.5\left(1 - \cos\left(\frac{2\pi n}{N}\right)\right);$$  Equation (6)

where $0 \leq n \leq N$, a linear frequency range distributed over the range of 2 KHz to 8 KHz was selected for the current work (though a larger range, such as 1-12 KHz could be used to incorporate the majority of North American bird songs or calls), thus yielding a span of 125 Hz per frequency band. For each second of input audio, the fingerprinting scheme described above produces approximately 86 frames (sub-fingerprints) and contains 4128 bits of information.

Referring again to FIG. 3, with the input audio signal fingerprinted, the fingerprint can be compared to fingerprints of stored signals in order to identify a match. This process is performed at step 256 by comparing the extracted fingerprint created at step 254 against a database of fingerprints using a scoring algorithm.

The present system and scoring algorithm uses, for example, dynamic linear programming (DLP) to perform scoring between the calculated fingerprint of the input audio signal and known fingerprints stored in a reference database. DLP is a process by which an optimal alignment of different sequences can be identified. In general, DLP depends upon a specific "reward/penalty" scheme representing bitwise matches/mismatches respectively. One scoring matrix is a 2×2 matrix (the matrix size is dictated by the possible states in each bit of data, here only 2 (0 or 1)). The specific scoring matrix can be manipulated by expectations regarding the degree of similarity expected between two sequences. Thus, it is possible to choose specific scoring matrices given an expectation of a suitable amount of similarity (e.g., 70%). In this way, it is possible to search for more closely related (preferred) or distantly related sequences. Additionally, as discussed below, gaps are needed too. Gaps have their own weighting scheme separate from the scoring matrix. Gaps are essentially penalties that are subtracted from the final alignment score determined by the scoring matrix.

The DLP-based scoring algorithm is arranged to compensate for gaps or other anomalies that may be present in a particular input fingerprint. As such, an input signal can be correctly matched to a stored reference signal even if a portion of the input signal is temporally shifted from the stored reference signal.

In the present system, it is possible for the fingerprint of an incoming audio signal to differ substantially from the stored reference signal that represents a match. For example, when the input audio signal represents a birdsong, the input signal may include additional syllables, gaps, pauses, and the like, which may cause the input bird song to differ from the matching reference birdsong. Conventional music-matching systems do not share this problem, as the input audio signal will always match the stored reference signal closely, as discussed above.

Figure 4A:
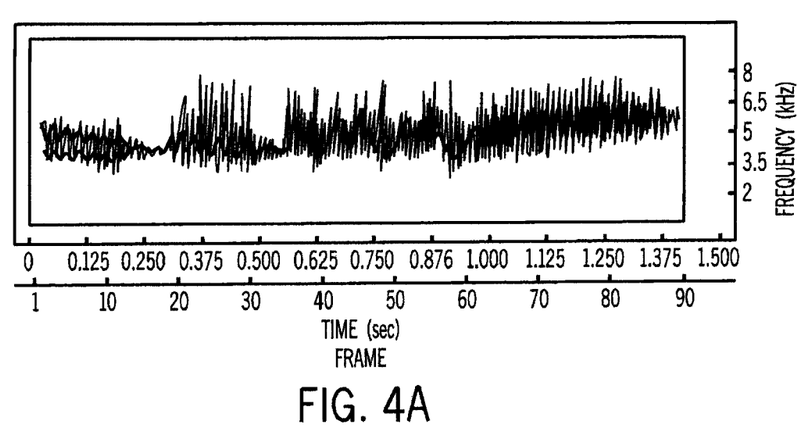
FIG. 4A is a graph showing a spectrogram of a first song of a male Cerulean Warbler.
Figure 4B:
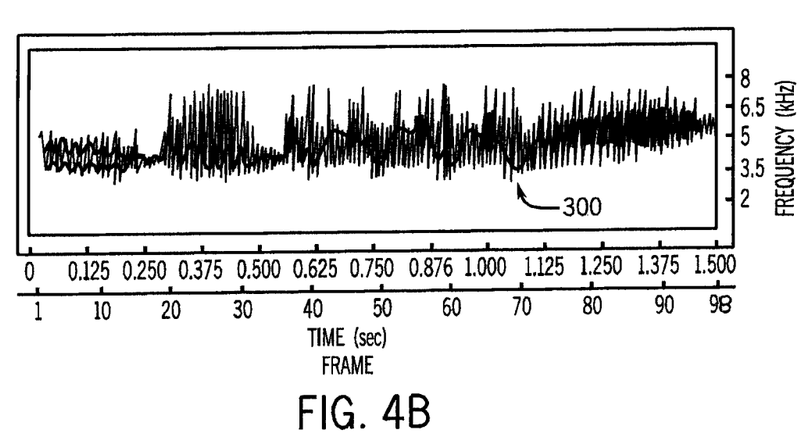
FIG. 4B is a graph showing a spectrogram of a second song of a male Cerulean Warbler.

For example, FIG. 4A shows a spectrogram of a first song of a male Cerulean Warbler (CW85127-01). This first song may be fingerprinted and stored as reference bird song for that particular bird. FIG. 4B shows a spectrogram of a second song of a male Cerulean Warbler (CW85127-12). The second song is very similar to the first, however the bird has inserted an extra syllable into the song, as indicated at 300.

Using conventional signal matching technologies, the signal shown in FIG. 4A could not be matched to the signal shown in FIG. 4B. Due to the additional syllable, only the beginnings of the two signals are similar to one other. The shift created by the additional syllable causes the fingerprints associated with all signals occurring thereafter to appear to differ markedly.

Accordingly, the present scoring algorithm uses a scoring algorithm that can account or compensate for temporal shifts of one or more portions of the signal. Such temporal shifts can be due to the addition or removable of content (e.g., syllables), or the removal or addition of pauses within a particular signal. However, the temporal shifts can also be due to tempo changes, such as are commonly conceived of as drawls, dialects, or accents in human speech.

In general, the scoring algorithm, when comparing two signals or fingerprints, scores a relatively large penalty when it is necessary to initially compensate for a temporal variation. For example a penalty is charged to insert a gap into, or remove a gap from, a particular signal or fingerprint in order to optimize a match. However, once that gap has either been inserted or removed, the penalty for shifting the remaining portions of the signal by the gap is significantly reduced.

For example, with references to FIGS. 4A and 4B, in order to optimize the match between the two signals a gap must be introduced into the signal of FIG. 4A to compensate for the additional syllable at 300 present in the signal of FIG. 4B. The scoring system will register a penalty for the insertion of that gap. However, once the gap has been inserted into the signal of FIG. 4A, any subsequent discrepancies between the signals (e.g., in the portions of the signal following the time at which the gap was inserted) will be scored with a reduced penalty.

Returning to FIG. 3, after extracting a fingerprint from the input audio signal, in step 256 the bits contained in each frequency block band across all n frames of the fingerprint are compared to known fingerprints using a DLP algorithm.

DLP is a computational method that provides the best alignment between two sequences, given a scoring system.

The goal of DLP in this system is to find the best alignment between two fingerprints under a given scoring system. Here, alignments can be thought of two fingerprints that may differ due to spectral (frequency) and temporal differences. Some differences can be less "different" (e.g., small differences in energy in a specific frequency bin) or more "different" (e.g., different frequencies alltogether or temporal changes).

The selection of a specific scoring matrix is advantageous as the scoring matrix controls the behavior of the DLP algorithm. Specifically, the scoring matrix is used to define the alignment score. Thus, the inputs into the DLP algorithm are 1) any two fingerprints (e.g. query and one or more of a plurality of database fingerprints), 2) a scoring matrix, and 3) a gap penalty.

The purpose of the scoring matrix is to reward matches (similarity) and penalize mismatches (differences). For example, between the fingerprints 1111111110111111 and 1111111111111111 all match except one mismatch of 0/1).

The selection of a particular scoring matrix may say something about the expected similarity of a given sequence comparison. For example, it is possible to define scoring matrices that are optimized to find alignments that are 70% similar or 80% etc. The selection of a scoring matrix can greatly affect the scoring output.

An example scoring matrix may be based upon a compositional inference (i.e. a candidate match should have at least 70% similarity among its bits (the vector representation)); these would also have the highest alignment score. Accordingly a first score may be determine when matching a fingerprint of an unknown bird song or call with a known predetermined fingerprint. The score may be determined based upon an optimal alignment between the two fingerprints. The score can be increased as the number of bitwise matches between the two fingerprints increases. Similarly, the score is decreased by bitwise mismatches between the fingerprints.

To optimize the alignment between fingerprints, a number of gaps may be inserted into one or both of the fingerprints to improve the alignment score. The insertion or opening of gap, as well as the extension of that gap (i.e., increasing the length of the gap) may be associated with penalties that can reduce the score of an alignment of the two fingerprints.

The gap penalty accommodates larger-scale differences between two fingerprints. For example, if a note is present in one fingerprint and not the other (c.f. the Cerulean Warbler comparison), the lengths of the fingerprints differ. The availability of a gap function allows the DLP algorithm to "split" one of the fingerprints in order to improve the alignment score.

However, the presence of a gap incurs a penalty as it is considered a "larger" change than what is handled by the scoring matrix alone. One example of a gap penalty system is an "Affine gap penalty". That gap penalty system includes two types of penalties: 1) a gap opening penalty, which is counted each time a gap is opened in an alignment, and 2) a gap extension penalty, which is counted for each extension of a gap in an alignment. In general, the opening penalty is larger than the extension, which may provide an optimize gap penalty algorithm when dealing with temporal alterations between fingerprints.

In one implementation, the system uses a match/mismatch penalty of +7/−11 (corresponding to 71.5% similarity) and an affine gap penalty of 15/5.

Depending on the types of identifications desired, different penalty matrices may be utilized. For example, a matrix that has a higher percentage similarity would be more useful in creating alignments/scores of individual songs belonging to the same species.

Figure 5:
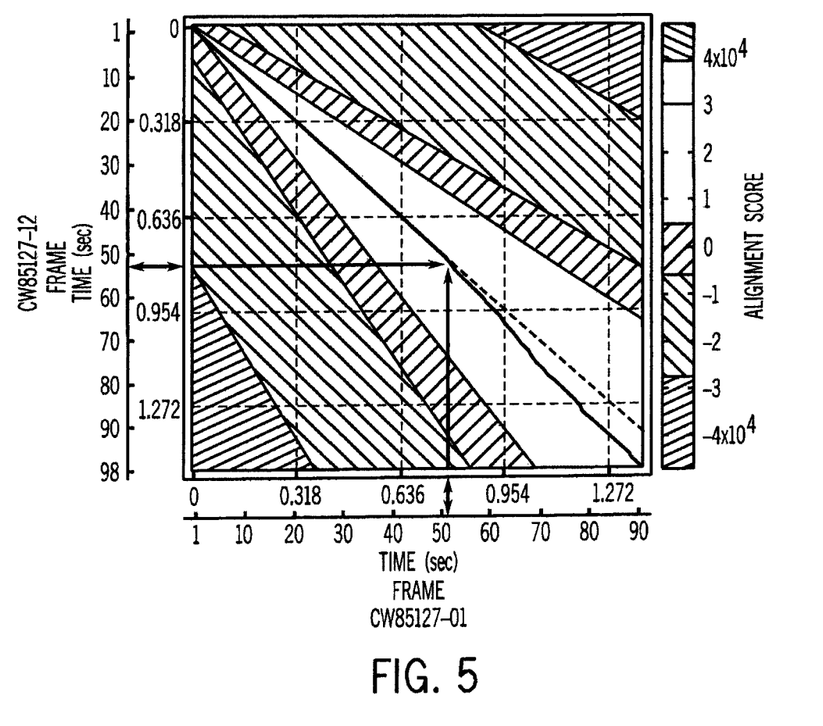
FIG. 5 is a graph showing a scoring space illustrating the pairing of energy differences in the optimal global alignments between the songs depicted in FIGS. 4A and 4B.

FIG. 5, for example, is a graph showing a scoring space illustrating the pairing of energy differences in the optimal global alignments between the songs depicted in FIGS. 4A and 4B. Within the scoring space, the alignment score applied to the two pairings at a given time are more constrained closer to time 0, and more relaxed at time 90. Accordingly, the scoring algorithm is more forgiving at later times where a temporal divergence between the two songs is more likely to have affect. Accordingly, the scoring space shown in FIG. 5 is configured to compensate for temporal differences found in similar signals. This is in contrast to existing comparison or scoring algorithms that always penalize for temporal shift by the same amount wherever the temporal shift is observed in a particular pair of signals.

As shown in FIG. 5, the two songs begin to diverge at the point illustrated by the two arrows. The divergence results from the additional signal present in the bird song of FIG. 4B. Due to the arrangement of the scoring space, though, the penalty of that shift is minimized as it occurs in the middle of the compared signals, rather than at the beginning. When compared across various fingerprints and scoring spaces, a highly accurate correlation between sample and database record can be made despite the lack of a "true" original and, if desired, a detailed report across various highly-scoring database records can be provided. Specifically, referring again to FIG. 3, the result of the processing is then reported at step 258. As described above, such reporting may take many forms, including an identification of a matched signal, a scoring report, and the like.

The present invention has been described in terms of one or more preferred embodiments, and it should be appreciated that many equivalents, alternatives, variations, and modifications, aside from those expressly stated, are possible and within the scope of the invention.

The invention claimed is:

1. A system for identifying a bird vocalization, comprising:
a microphone for capturing an input audio signal representing the bird vocalization;
a fingerprint extraction system coupled to the microphone to receive the captured input audio signal and generate a fingerprint of the input audio signal; and
a processor configured to receive the fingerprint of the input audio signal from the fingerprint extraction system, the processor being configured to:
analyze the fingerprint of the input audio signal,
compare the fingerprint of the input audio signal to a set of categorized samples of bird vocalization to determine an identity of a bird species associated with the bird vocalization, the identity being determined by a similarity of the fingerprint of the input audio signal to at least one of a plurality of predetermined fingerprints within the set of categorized samples of bird vocalizations, wherein the similarity is determined by determining a score of a desirable alignment between the fingerprint of the input audio signal and the at least one of a plurality of predetermined fingerprints, wherein the score of the desirable alignment is decreased by a first penalty upon the opening of a gap in the fingerprint of the input audio signal or the at least one of a plurality of predetermined fingerprints to improve the alignment of the fingerprint of the input audio signal and the at least one of a plurality of predetermined fingerprints, and
generate a report including content associated with the bird species.

2. The system of claim 1, wherein the processor is further configured to increase the score of the desirable alignment for bitwise matches between the fingerprint of the input audio signal and the at least one of a plurality of predetermined fingerprints and decrease the score of the desirable alignment for bitwise mismatches between the fingerprint of the input audio signal and the at least one of a plurality of predetermined fingerprints.

3. The system of claim 1, wherein the processor is further configured to decrease the score of the desirable alignment by a second penalty upon the extension of the gap in the fingerprint of the input audio signal or the at least one of a plurality of predetermined fingerprints to improve the alignment of the fingerprint of the input audio signal and the at least one of a plurality of predetermined fingerprints.

4. The system of claim 1, wherein the fingerprint of the input audio signal comprises a 48-bit fingerprint.

5. The system of claim 1, wherein the fingerprint of the input audio signal includes 48 frequency bands.

6. The system of claim 1, wherein the input audio signal is filtered using a Chebyshev Type II filter.

7. The system of claim 6, wherein the Chebyshev Type II filter has stopband edge frequencies of approximately 1.95 KHz and 8.05 KHz.

8. The system of claim 1, further comprising a communication system coupling the processor and the fingerprint extraction system another processor and wherein the fingerprint extraction system is configured to transmit the fingerprint of the input audio signal to the processor.

9. A method of identifying a bird vocalization, comprising:
  receiving a fingerprint of an input audio signal representing the bird vocalization;
  determining a score of a similarity of the fingerprint of the input audio signal to at least one of a plurality of predetermined fingerprints by determining a score of a desirable alignment between the fingerprint of the input audio signal and the at least one of a plurality of predetermined fingerprints, wherein the score of the desirable alignment is decreased by a first penalty upon the opening of a gap in the fingerprint of the input audio signal or the at least one of a plurality of predetermined fingerprints to improve the alignment of the fingerprint of the input audio signal and the at least one of a plurality of predetermined fingerprints; and
  generating a report based on the score of the similarity and an identity of the at least one of the plurality of the predetermined fingerprints, the report identifying a bird species associated with the bird vocalization.

10. The method of claim 9, including increasing the score for bitwise matches between the fingerprint of the input audio signal and the at least one of a plurality of predetermined fingerprints and decreasing the score for bitwise mismatches between the fingerprint of the input audio signal and the at least one of a plurality of predetermined fingerprints.

11. The method of claim 9, wherein determining a desirable alignment between the fingerprint of the input audio signal and the at least one of a plurality of predetermined fingerprints includes opening a gap in the fingerprint of the input audio signal or the at least one of a plurality of predetermined fingerprints to optimize an alignment of the fingerprint of the input audio signal and the at least one of a plurality of predetermined fingerprints.

12. The method of claim 11, including:
  applying a second penalty to the score when the gap is extended.

13. The method of claim 9, wherein the fingerprint of the input audio signal comprises a 48-bit fingerprint.

14. The method of claim 9, wherein the fingerprint of the input audio signal includes 48 frequency bands.

15. The method of claim 9, wherein the input audio signal is filtered using a Chebyshev Type II filter.

16. The method of claim 15, wherein the Chebyshev Type II filter has stopband edge frequencies of approximately 1.95 KHz and 8.05 KHz.

17. A method of identifying a bird vocalization, comprising:
  capturing an input audio signal representing the bird vocalization;
  generating a fingerprint of the input audio signal;
  transmitting the fingerprint of the input audio signal to a remote server;
  receiving, from the remote server, an identity of a bird species associated with the bird vocalization, the identity being determined by a similarity of the fingerprint of the input audio signal to at least one of a plurality of predetermined fingerprints, wherein the similarity is determined by determining a score of a desirable alignment between the fingerprint of the input audio signal and the at least one of a plurality of predetermined fingerprints, wherein the score of the desirable alignment is decreased by a first penalty upon the opening of a gap in the fingerprint of the input audio signal or the at least one of a plurality of predetermined fingerprints to improve the alignment of the fingerprint of the input audio signal and the at least one of a plurality of predetermined fingerprints; and
  generating a report including content associated with the bird species.

18. The method of claim 17, wherein the score of the desirable alignment is increased for bitwise matches between the fingerprint of the input audio signal and the at least one of a plurality of predetermined fingerprints and decreased for bitwise mismatches between the fingerprint of the input audio signal and the at least one of a plurality of predetermined fingerprints.

19. The method of claim 17, wherein the score of the desirable alignment is decreased by a second penalty upon the extension of the gap in the fingerprint of the input audio signal or the at least one of a plurality of predetermined fingerprints to improve the alignment of the fingerprint of the input audio signal and the at least one of a plurality of predetermined fingerprints.

* * * * *

UNITED STATES PATENT AND TRADEMARK OFFICE
CERTIFICATE OF CORRECTION

| | | |
|---|---|---|
| PATENT NO. | : 9,058,384 B2 | Page 1 of 1 |
| APPLICATION NO. | : 13/440975 | |
| DATED | : June 16, 2015 | |
| INVENTOR(S) | : Berres | |

It is certified that error appears in the above-identified patent and that said Letters Patent is hereby corrected as shown below:

In the claims

Column 13, line 25, claim 8 - "system another processer and", should read --system and--

Signed and Sealed this
Twentieth Day of October, 2015

Michelle K. Lee
*Director of the United States Patent and Trademark Office*